Sept. 24, 1963 P. J. MARINO 3,105,112
HUB CONTROL CIRCUIT
Filed Oct. 24, 1961
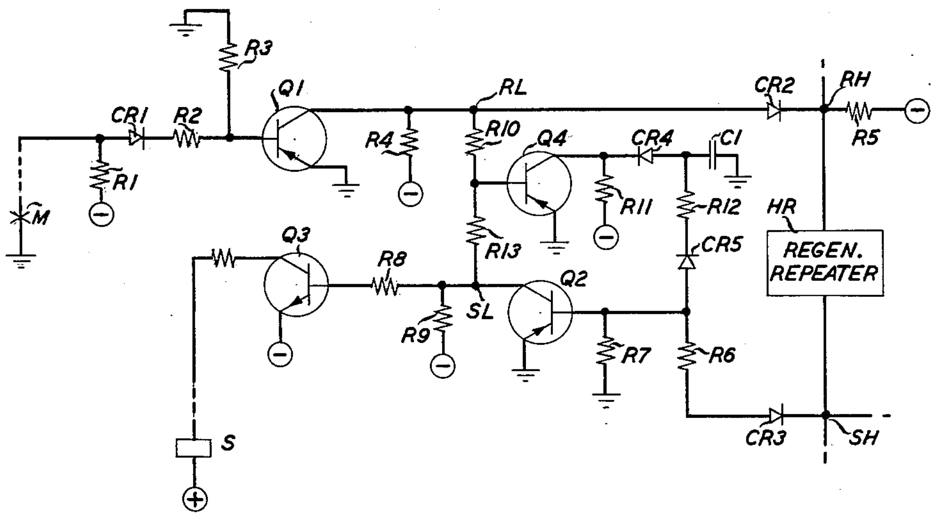
INVENTOR
P. J. MARINO
BY R C Lipton
ATTORNEY United States Patent Office 3,105,112
Patented Sept. 24, 1963

3,105,112
HUB CONTROL CIRCUIT

Patrick J. Marino, Elmhurst, N.Y., assignor to Bell Telephone Laboratories, Incorporated, New York, N.Y., a corporation of New York Filed Oct. 24, 1961, Ser. No. 147,284
5 Claims. (Cl. 178—73)

This invention relates to a telegraph hub coupling circuit and more particularly to a control circuit for a coupling unit interconnecting a telegraph transmission circuit and a telegraph hub concentration.

A broad object of this invention is to provide an improved telegraph hub coupler circuit.

In certain telegraph exchange systems it is desirable to arrange the network in such a manner that any one of a group of exchange subscribers may simultaneously transmit to all the others in the group. This is preferably accomplished by utilizing a hub concentration wherein each subscriber transmission circuit is extended by way of an individual receiving leg to a common receiving terminal, hereinafter referred to as the receive hub, and by way of an individual sending leg to a common sending terminal, hereinafter referred to as the send hub. By interconnecting the receive hub and the send hub by way of a regenerative repeater, for example, signals incoming from any one of the subscriber transmission circuits are applied through the individual receiving leg, the receive hub and the regenerative repeater to the send hub whereby the regenerated signal is simultaneously transmitted to the other subscribers through their respective sending legs.

Since the signal being transmitted from the subscriber station to the hub is also retransmitted back to the subscriber sending leg after a delay introduced primarily by the repeater, such retransmission would mutilate the transmitted message. Accordingly, it is preferable to introduce a control circuit between each of the receiving legs and sending legs to block the sending leg when signals are received by the associated receiving leg. In addition, each control circuit is arranged to remove the block when another subscriber transmits to the hub. However, prior control circuits which provide these functions are relatively complex and expensive.

It is an object of this invention to provide a simple and inexpensive hub coupler control circuit which blocks the sending leg when signals are received by the associated receiving leg and unblocks the sending leg when another subscriber sends to the hub.

In accordance with the present invention, the hub control circuit employs an inverter circuit for producing a marking signal during the application of a spacing signal to the receiving leg. This marking signal is applied to the sending leg by way of a delay circuit having a delay corresponding to the delay of the repeater whereby the sending leg is held in a marking condition during the interval that the incoming spacing signal is retransmitted to the sending leg. When another subscriber starts to transmit, a prolonged spacing signal is received by the hub, which spacing signal is retransmitted to the sending leg. If a spacing signal is also being applied to the receiving leg, the sending leg is not placed in the spacing condition until a mark is received and the marking condition applied by the control circuit is removed. When this occurs the spacing signal output of the sending leg is fed to the input of the inverter circuit in opposition to any spacing signal applied by the receiving leg, whereby the hub control circuit is disabled and the prolonged spacing signal is transmitted to the subscriber to indicate that another subscriber desires to transmit.

The means for fulfilling the foregoing objects and a practical embodiment of the features of this invention will be fully understood from the following description taken in conjunction with the accompanying drawing which shows, in schematic form, the details of a hub control circuit in accordance with this invention.

Referring now to the drawing, the sending side of the subscriber transmission circuit is represented by contacts M which apply ground to the junction of resistor R1 and Zener diode CR1 during the transmission of a mark signal and remove the ground during the transmission of a space signal. The receiving side of the subscriber transmission circuit is represented by relay S which is arranged to be energized by a marking signal from the hub and de-energized by a spacing signal from the hub, as described hereinafter. The common hub includes a receive hub indicated by terminal RH, which terminal is connected to diode CR2 in the receiving leg, and similarly connected to the receiving legs associated with the other subscriber transmission circuits. Incoming signals applied to receive hub terminal RH are preferably retransmitted through the regenerative repeater, generally indicated by block HR, to send hub terminal SH. As is well known in the art, a regenerative repeater delays a signal for an interval of about one-half a normal signal element before it appears at the output thereof. Accordingly, a delayed signal is applied through send hub terminal SH to diode CR3 in the sending leg and similarly applied to the sending legs associated with the other subscriber transmission circuits.

Assuming now that an incoming marking signal from the subscriber is received by the subscriber transmission circuit, contacts M are closed applying ground to diode CR1. With ground being applied through resistors R3 and R2 to the other terminal of diode CR1, the base of transistor Q1 which is connected to the junction of resistors R2 and R3 has a ground potential applied thereto. This turns transistor Q1 OFF since ground is connected to the emitter and negative battery is thereby applied to the collector by way of resistor R4. Terminal RL in the sending leg is therefore placed in a negative marking condition in response to the incoming marking signal.

The negative potential on terminal RL is applied to diode CR2, back biasing the diode. With diode CR2 back biased, and therefore nonconducting, negative battery is applied through resistor R5 to receive hub terminal RH placing the receive hub in the negative marking condition. This negative marking signal is regenerated by repeater HR and, after the previously described delay, fed to send hub terminal SH. The negative potential on send hub terminal SH is impressed on diode CR3, rendering the diode conductive, whereby a negative potential is applied to the base of transistor Q2 through diode CR3 and resistor R6. The negative potential on the base of transistor Q2 turns the transistor On whereby ground is applied through the emitter-to-collector path of the transistor to terminal SL of the sending leg. The ground on terminal SL is, in turn, fed through resistor R8 to the base of transistor Q3. Since the emitter of transistor Q3 is connected to negative battery, transistor Q3 turns On, drawing collector current through the winding of relay S. The energization of relay S provides a marking indication to the subscriber as is well known in the art.

It is recalled that the reception of a marking signal by the receiving leg applies negative battery to terminal RL. In addition, the application of the marking signal to the sending leg applies ground to terminal SL. Accordingly, negative battery and ground is placed across resistors R10 and R13 whereby the junction of these resistors is negative relative to ground. The junction of resistors R10 and R13 is connected to the base of inverter transistor Q4 and with the base at a negative potential, transistor Q4 turns On applying ground through the emitter-to-collector path to the junction of resistor R11 and diode CR4. Since the base of transistor Q2 is at a negative potential at this time, this negative potential placed across diode CR5, resistor R12, and diode CR4 back biases the diodes whereby they are in a nonconducting state. Accordingly, during the reception of a marking signal by the receiving leg, the output of inverter transistor Q4 is isolated from the sending leg.

Assuming now that a space signal is received from the subscriber, contacts M open whereby negative battery is applied through resistor R1 to Zener diode CR1. This breaks the diode down applying the negative battery through resistor R2 to the base of transistor Q1. With negative battery on the base of transistor Q1 the transistor turns On and ground is applied through the emitter-to-collector path of the transistor to terminal RL. This ground is, in turn, applied to diode CR2, rendering the diode conductive whereby a spacing ground signal is presented to receive hub terminal RH.

The spacing ground signal on receive hub terminal RH is applied through regenerative repeater HR after the above-mentioned delay to send hub terminal SH. With ground on send hub terminal SH diode CR3 is back biased and therefore rendered nonconductive.

Recalling now that when the spacing signal is initially received by the receiving leg placing terminal RL in the spacing ground condition, terminal SL of the sending leg is still in the marking ground condition due to the delay of regenerative repeater HR. This places ground across resistors R10 and R13, driving the potential on the base of transistor Q4 to ground. With ground on the base of transistor Q4, the transistor turns Off and negative voltage is applied to the collector by way of resistor R11. This negative voltage renders diode CR4 conductive and capacitor C1 is negatively charged through diode CR4. In addition, the negative battery applied through diode CR4 is extended through resistor R12 and diode CR5 to the base of transistor Q2. The application of the negative potential to the base of transistor Q2 maintains the transistor conductive, whereby a marking ground condition is maintained on terminal SL. Accordingly, the sending leg is maintained in a marking condition and the incoming signals are not retransmitted back to the subscriber transmission circuit.

Assuming now that the application of a marking signal to the receiving leg is restored, transistor Q1 is again turned Off, as previously described. This restores the negative marking potential applied to terminal RL. Diode CR2 is thus again rendered nonconductive whereby receive hub terminal RH goes to the negative marking condition. This negative marking signal is applied through regenerative repeater HR after the above-mentioned delay to send hub terminal SH and then through diode CR3 and resistor R6 to the base of transistor Q2.

It is recalled that due to the delay of repeater HR a spacing condition is applied to diode CR3 for the duration of a one-half signal element after the reception of the marking signal by the receiving leg. It is further noted that the negative marking condition of terminal RL again turns On transistor Q4 removing the negative potential applied through resistor R11 to diode CR4. Accordingly, the negative charging current applied to capacitor C1 is removed and the capacitor begins to discharge through resistor R12 and diode CR5. The discharge time is such that the base of transistor Q2 is maintained negative for a duration exceeding a one-half signal element maintaining the sending leg in the marking condition. After the one-half signal element interval, capacitor C1 discharges sufficiently to allow transistor Q2 to be cut off. However, at this time the negative marking condition of send hub terminal SH is established, applying a negative potential through diode CR3 and resistor R6 to maintain transistor Q2 On. Accordingly, the sending leg is maintained in the marking condition during the reception of signals by the receiving leg.

Assuming that another subscriber desires to transmit, the initial signal from the other subscriber will constitute a prolonged spacing signal. This spacing signal is applied through the receiving leg of the other subscriber to set received hub terminal RH to the spacing ground condition. Accordingly, ground is applied by send hub terminal SH to diode CR3, rendering the diode nonconductive. If, with this condition existing, the input to the receiving leg is also spacing, the spacing ground condition at terminal RL turns transistor Q4 Off, as previously described, whereby the negative potential is applied through resistor R11, diode CR4, resistor R12 and diode CR5 to the base of transistor Q2. Accordingly, the sending leg is maintained in a marking condition and this condition will continue until the receiving leg receives a marking signal.

When the marking signal is received by the receiving leg, the negative marking condition of terminal RL turns transistor Q4 On, back biasing diode CR4. Accordingly, capacitor C1 discharges through resistor R12 and diode CR5 and after an interval exceeding a one-half signal element the capacitor discharges sufficiently to allow transistor Q2 to be cut off by virtue of the ground applied to the base through resistor R7. Transistor Q2 going Off causes its collector potential to be rendered negative from negative battery applied through resistor R9 whereby terminal SL is placed in the negative spacing condition. This negative potential is applied through resistor R8 to the base of transistor Q3 turning the transistor Off. With transistor Q3 turned Off the energizing current for relay S is removed, whereby a spacing signal is transmitted to the subscriber.

As previously mentioned, when transistor Q2 turns Off terminal SL is placed in the negative spacing condition. This negative potential is applied through resistor R13 to the base of transistor Q4 whereby the transistor is maintained conductive so long as the sending leg is in the spacing condition. With transistor Q4 conductive, diode CR4 is back biased, isolating the control circuit from the sending leg. For the remaining duration of the prolonged spacing pulse, the control circuit is thus maintained disabled and the sending leg remains in the spacing condition.

Although a specific embodiment of this invention has been shown and described, it will be understood that various modifications may be made without departing from the spirit of this invention and within the scope of the appended claims.

What is claimed is:

1. A hub control circuit for interconnecting the incoming and outgoing terminals of a telegraph transmission circuit with a hub circuit comprising a first and second resistive means connected in series across said incoming terminal and said outgoing terminal, a receiving leg independent of said resistive means for applying signals received from said transmission circuit incoming terminal to said hub circuit, a sending leg connected to said hub circuit for applying signals to said outgoing terminal, an inverter circuit connected to the junction of said resistive means, and means for applying the output of said inverter circuit to the input of said sending leg.

2. A hub control circuit for interconnecting the incoming and outgoing terminals of a telegraph transmission circuit with a hub circuit comprising a first and second resistive means connected in series across said incoming terminal and said outgoing terminal, a receiving leg independent of said resistive means for applying signals received from said transmission circuit incoming terminal to said hub circuit, a sending leg connected to said hub circuit for applying signals to said outgoing terminal, an inverter circuit connected to the junction of said resistive means, uniconductive means for applying the output of said inverter circuit to the input of said sending leg, and delay means for delaying the application of the output of said inverter circuit to said uniconductive means.

3. A hub control circuit for interconnecting the incoming and outgoing terminals of a telegraph transmission circuit with a hub circuit comprising, a receiving leg connected to said incoming terminal for applying mark and space signals received from said transmission circuit to said hub circuit, a sending leg connected to said hub circuit for applying mark and space signals to said outgoing terminal, an inverter circuit connected to said incoming terminal for applying mark signals to the input of said sending leg during the reception of space signals from said incoming terminal, and means interconnecting the output of said sending leg and the input of said inverter circuit for disabling said inverter circuit during the application of space signals to said outgoing terminal.

4. A hub control circuit for interconnecting the incoming and outgoing terminals of a telegraph transmission circuit with a hub circuit comprising a sending leg connected to said hub circuit for applying signals to said outgoing terminal, an inverter circuit connected to said incoming terminal for applying signals of one condition to the input of said sending leg in response to signals of another condition, a receiving leg independent of said inverter circuit for applying signals received from said incoming terminal to said hub circuit, and means connected to the output of said sending leg for disabling said inverter circuit in response to signals of said other condition.

5. A hub control circuit for interconnecting the incoming and outgoing terminals of a telegraph transmission circuit with a hub circuit comprising, a sending leg connected to said hub circuit for applying mark and space signals to said outgoing terminal, an inverter circuit connected to said incoming terminal for applying a mark signal to the input of said sending leg during the reception of a space signal from said incoming terminal, a delay circuit responsive to said mark signal output of said inverter circuit for prolonging the application of said mark signal to the input of said sending leg for a predetermined interval after the termination thereof, a receiving leg independent of said inverter circuit for applying mark and space signals received from said incoming terminal to said hub circuit, and means interconnecting the output of said sending leg and the input of said inverter circuit for disabling said inverter circuit during the application of space signals to said outgoing terminal.

References Cited in the file of this patent

UNITED STATES PATENTS

| | | |
|---|---|---|
| 2,632,054 | Hanley | Mar. 17, 1953 |
| 2,713,087 | Neiswinter | July 12, 1955 |
| 3,033,929 | Neiswinter | May 8, 1962 |
| 3,038,035 | Davey | June 5, 1962 |
| 3,040,131 | Bruder | June 19, 1962 |